Oct. 15, 1963 P. O. SKOOG Re. 25,463

METHOD AND MEANS FOR PRODUCING TIGHT-FITTING PATCHES FOR USE IN PLYWOOD-PATCHING MACHINES

Original Filed April 30, 1957 2 Sheets-Sheet 1

PER OLOF SKOOG
INVENTOR.

BY Clarence M. Luck

PER OLOF SKOOG
*INVENTOR.*

*BY* Smith & Tuck

United States Patent Office

Re. 25,463
Reissued Oct. 15, 1963

25,463

METHOD AND MEANS FOR PRODUCING TIGHT-FITTING PATCHES FOR USE IN PLYWOOD-PATCHING MACHINES

Per Olof Skoog, Rte. 1, Box 290, Olympia, Wash.

Original No. 3,021,249, dated Feb. 13, 1962, Ser. No. 656,096, Apr. 30, 1957. Application for reissue Sept. 21, 1962, Ser. No. 226,770
6 Claims. (Cl. 156—98)

Matter enclosed in heavy brackets [ ] appears in the original patent but forms no part of this reissue specification; matter printed in italics indicates the additions made by reissue.

My present invention relates to the general art of patching plywood, and more particularly to a method and means for cutting, in sequential operation, a patch which will be a tight fit in the patch opening cut in the veneer sheet during the same operational sequence.

In the patching of plywood it is necessary to use machinery that will sequentially cut out the defective portion, thus leaving an opening in the veneer sheet, and then to cut from another piece of veneer a patch to fit the opening just produced. In past operations it has been observed that, with sharp angles on the die-cutting edges of the veneer patching machine, the plug or patch cut on the lower edge of the table die and the hole cut by the hole-punch on the upper edge of the table die were very nearly the same size. This clearance was of necessity so close that the patch would not fit sufficiently tight in the sheet of veneer to prevent glue leakage into the joint when the sheets were laminated into plywood.

Experienced operators have found that it was necessary to hone the inside lower edge of the table die so as to cause it to cut a patch larger than the actual opening in the table die. This arrangement gives sufficient interference to prevent most leakage of the glue through the joint after the plug is inserted into the sheet. To accomplish this effect, it is necessary to hold a hone on the lower cutting edge at about 10° to 15° with respect to the inside surface and honing the opening of the die so that the plug would be wider than the actual through die opening. More honing was done where the patch was widest and less honing where the patch was narrow. This method could be made to work quite well, except for certain limitations which will be further explained.

The honing operation is of necessity a hand operation, and it will therefore depend upon the skill of a workman to achieve the proper widening of the die. It is difficult to tell by looking at the die when sufficient honing has been achieved, and it was therefore found that the honing could be best done when the die was installed on the patching machine. Under these conditions a patch could be cut and checked and, if more honing was required, it could be done on the machine. If the die was overwidened by honing, the patch, being too large, would split the veneer sheet. Each time the die was resharpened the previous tightened bevel was ground away and the die then required inside honing again. On a machine of this type, used to patch plywood sheets, die sharpening must be done every day, and it can be seen that a highly skilled mechanic and considerable of his and the patching machine's time were required when employing this method.

In this new method, the patch is tightened by reshaping the inside surface of the die, by a stepped-back perpendicular wall, so that the patch is tightened in the proper places. Furthermore, the surface is thus so cut that the sharpening of the lower cutting edge of the die does not change the size of the patch cut, and the die will continue to cut the same size patch until the lower cutting edge bearing portion is entirely ground away. Following this method, there is a taper from this stepped-back surface to the standard die opening, and the purpose of this is to compress the plug so that it may enter the hole in the sheet, which is the same size in the upper opening in the table die. The size of the plug punch remains the same, as it is a standard set of dies, then it may pass clear through the table die and insert the patch in the seat. This method has overcome the many difficulties encountered in the past with the various forms of honing which were resorted to, because with this method the die cuts the patch wider in proportion to the width of the opening and maintains square edges. This feature is deemed necessary because wood is more compressible when stressed perpendicular to the grain than when cut with the grain. The cross-grain dimension therefore is normally considered to be the width of the patch and with the grain dimension is normally referred to as the length of the patch even though the patch may be round, square or elongated.

The principal objects of my present invention, therefore, are to provide a method and means so that in a sequential operation, where a defect is cut out of a piece of veneer, a replacement plug is cut which will be slightly larger than the opening provided and to insert the newly cut plug into the defect opening so tightly that high grade plywood can be made up from veneer sheets that have been so patched.

A further object of this present invention is to provide a veneer patch-cutting die wherein the cutting edge will cut a veneer patch which then progresses through the die and in so doing passes through a restricting taper portion and then through a perpendicularly walled portion of the die which retains the compression imparted by the taper portion and holds it compressed until the moment that it is seated in the defect opening previously cut.

A further object of this invention is to provide a die means in which the cutting portion of the die is provided with perpendicular inner walls so that repeated honings can be made on the outer tapered surface of the cutting die, in order to maintain the keen cutting edge required, without in any way changing the inside dimensions of the die, and this enables the die to continue to cut patches of a predetermined size throughout its entire working life.

A further object of this invention is to provide a method for cutting veneer patches, in which during the cutting operation the wood is stressed perpendicular to the grain in order to take advantage of the fact that wood is more compressible under this condition than when stressed with the grain.

Further objects, advantages and capabilities will be apparent from the description and disclosure in the drawings, or may be comprehended or are inherent in the device.

Figure 1:
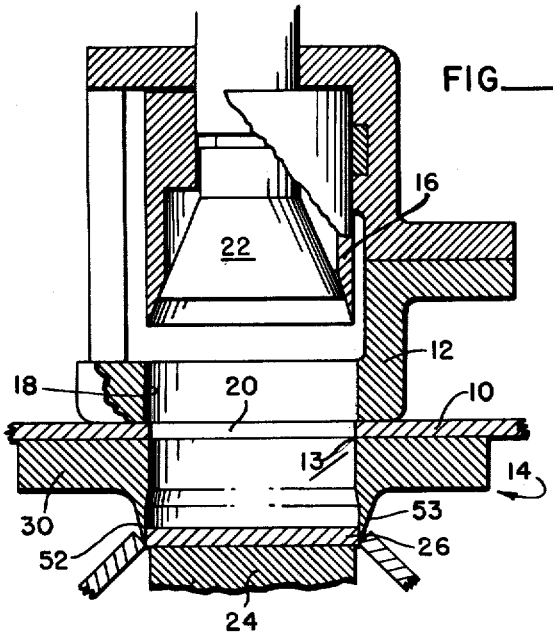
FIGURE 1 is a vertical sectional view, in fragmentary form, showing the various elements involved in a sequential patching machine for plywood.

Referring more particularly to the disclosure in the drawings, the numeral 10 designates the sheet of veneer to be patched. This sheet, in the area immediately under consideration, is held down by the hold-down 12 snugly against the table die 14 having the upper *female* cutting edge 13 and the lower cutting knife edge 50 which is fixed in position. In the sequential operation of patching a piece of veneer stock, the first operation is to grip sheet 10, as indicated in FIGURE 1, between the table die 14 by means of the movable hold-down 12. Then the hole-cutting punch die 16 is driven downwardly through hold-down 12, which is provided with ample clearance at 18, so as to hold the veneer securely in place yet permit free passage of the knife type hole-punch die 16. After cutting the opening at 20 in the veneer sheet 10, the hole-punch die 16 is retracted and, when well above the veneer sheet, the knockout punch 22 is driven downwardly as viewed with respect to die 16, so as to knock out the cut veneer waste piece which is disposed of in various ways, leaving opening 20 clear. During part of this cycle the plug or patch punch 24 is being driven upwardly and cuts the veneer patch 26 from a separate sheet or strip of veneer, and this patch is carried upwardly through die 14 by the plug punch until it is seated in opening 20 and substantially flush with the surfaces of sheet 10.

Figure 8:
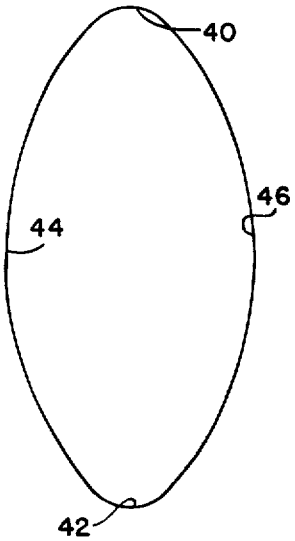
FIGURE 8 illustrates a variant form of die opening.
Figure 2:
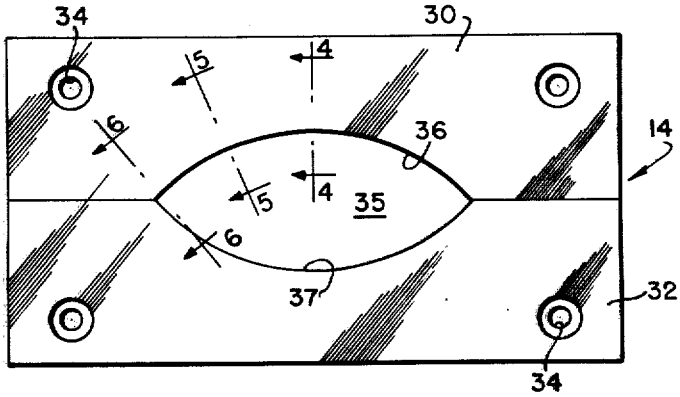
FIGURE 2 is a top plan view of a table die used in the arrangement of FIGURE 1.
Figure 3:
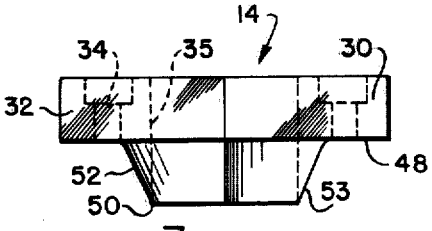
FIGURE 3 is an elevation of the die shown in FIGURE 2.

In FIGURES 2 and 3 is shown the table die 14. This die, for convenience of construction and as an economy in replacements, which may result from damage and the like, is preferably made of two separate pieces, as the half-members 30 and 32. These members are each provided with through securing bolt openings 34. Each of members 30 and 32 is machined to provide one-half of the die cutout, as 36 and 37, respectively. A preferred form of this cutout is after the showing of FIGURE 2. However, this present method may be applied to variously shaped dies, such as round, square, diamond shaped or any other desired shape, and a variant form of this opening is shown in FIGURE 8, in which the general form is the same as that shown in FIGURE 2, excepting that at each end arcuate portions as 40 and 42 are provided, which merge with the main wall portions as 44 and 46. The underside of die 14 conforms to the general showing of FIGURE 3, in which the walls of opening 35, as 36 and 37, are continued downwardly past the bolting-on flange portion 48, so as to provide the cutting edge 50. A desirable characteristic of this cutting edge is that the inner walls are perpendicularly disposed to the veneer as a cut is being made, and the outer walls 52 and 53 are tapered so as to come to an apex with walls 36 and 37 and thus provide the tapering cutting edge 50 which is sharpened or honed on its outer surface only.

The form of the interior walls of table die 14 is very essential to the present invention and makes the present method possible. This form is probably best shown in FIGURES 4, 5 and 6 which are vertical sections taken along similarly numbered lines of FIGURE 2. It is to be noted that the upper portion of wall 36 is disposed at right angles to the upper surface of the table die member 30. This is a desirable arrangement, as the upper portion of the die opening must accommodate the hole-punch die 16 at the lower portion of its cutting stroke, wherein the defect is being cut out of the veneer sheet 10. The lower portion of the interior walls 36 and 37 is cut on a radius whose center of generation is shifted to the right as viewed in FIGURE 7, the amount of enlargement being indicated by the reference character t and is the increment 55. The new wall portion 56 is also disposed at right angles to the upper surface of the die 14. The two parallel walls 56 and 36 are joined by a tapered wall 58, said wall adapted to act as a forcing cone. A convenient taper for this wall is, as indicated in the drawings, 1°.

Now, the extreme cutting edge 50 must be sharpened to a keen cutting edge, and this can only be done under service conditions by honing the same. It will be clear, it is believed, from the showing of FIGURES 4, 5 and 6 that this honing need only be done on the outer surface as 52 and 53, where it can be easily and uniformly accomplished. It is not necessary to hone the inside of the die opening, because wall 56 is set back from the vertical projection of wall 36 by the increment t, and this is a fixed vertical wall throughout the life of the die and provides all the oversize cutting for patches 26 that will be required during the life of the die. This is a marked improvement over the older methods, wherein the inside of a die opening was honed daily, normally, in order to achieve a cutting edge that would be outwardly disposed sufficiently to make the patches somewhat oversize. This was always a hand operation and would vary with the individual, and there might be a great variance between two individuals who at different times might work on the same die. The difficulty of leaving this operation to the skill of a mechanic is due to the fact that the required clearance may be only of the order of three- to five- or six-thousandths in normal operations and normally within the extremes of one-thousandth of an inch to seven-thousandths of an inch. The actual amount depends upon the thickness of the veneer and the species of the wood forming the veneers to be patched.

Figure 5:
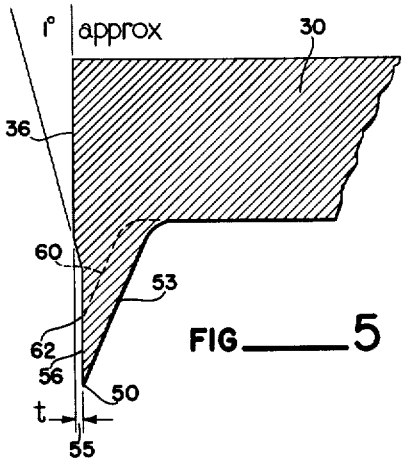

As a die of this order is daily sharpened and sometimes more frequently honed, there is considerable wear, and this has been indicated in FIGURE 5 by the dotted line 60. It is believed it will be evident that, even though the entire cutting point was sharpened or honed away up to a point where the cutting edge was at 62, as long as there is sufficient surface 56 left to determine the margins of the patch, the patches will be of the same peripheral form and size as those made when the die was newly installed with its cutting point out as indicated at 50.

My present method is believed to be quite in step with modern industrial requirements, namely, that there should be a very minimum of stoppage of any machine used in an industrial operation during its normal working hours. It should be apparent, of course, that a number of men are required in the handling of materials to and from the patching machinery, and, if the machine does not satisfactorily perform and must be shut down, a very considerable and expensive wastage of personnel time ensues. With my present method and the means to implement the same, it is believed that the operational procedure of finishing and maintaining dies of this order has been reduced to the exactness that can only be achieved by machine-finished operations. It is for this reason that the oversize increment t is so much better established by an accurate and precise machine operation than by hand honing, as has been required in the past.

Figure 4:
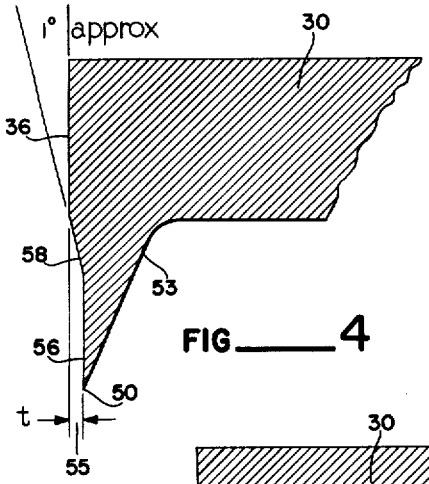
FIGURES 4, 5 and 6 are enlarged vertical sectional views taken along similarly numbered lines of FIGURE 2.
Figure 6:
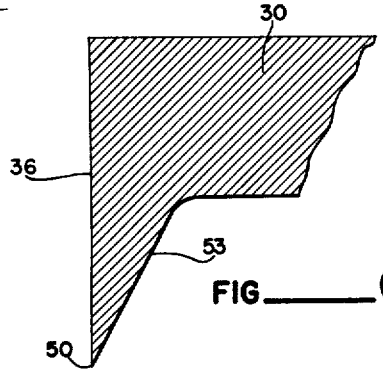

Extended trials and experiments have indicated that portions of the die require a larger offset than others, and this has been graphically represented in FIGURES 4, 5 and 6, in which FIGURE 4, taken along the minor or transverse axis of opening 35, takes the greatest amount of offset or t. An average value for this offset is in the neighborhood of .003 inch. The other extreme will be at the very end of the opening, or rather at the end of the longitudinal or greater axis, and at this point there will be little, if any, requirement for offset. For all practical purposes, in the form shown in FIGURE 2 the die would be formed with the wall perfectly straight, as indicated in FIGURE 6. At intermediate portions between sections 4—4 and 6—6 as, for instance, that indicated by section 5—5, an intermediate value would be employed which would be less than the value established along the minor axis shown in section 4—4, the increment t varying from maximum at section 4—4 to a minimum, or zero for many forms of dies, at section 6—6. In the variant form of die illustrated in FIGURE 8, the maximum value for t would occur along the minor or transverse axis and, as the curve of the end portions indicated at 40 and 42 decreases in radius, there will be need for decreasing the offset t for these portions.

Figure 7:
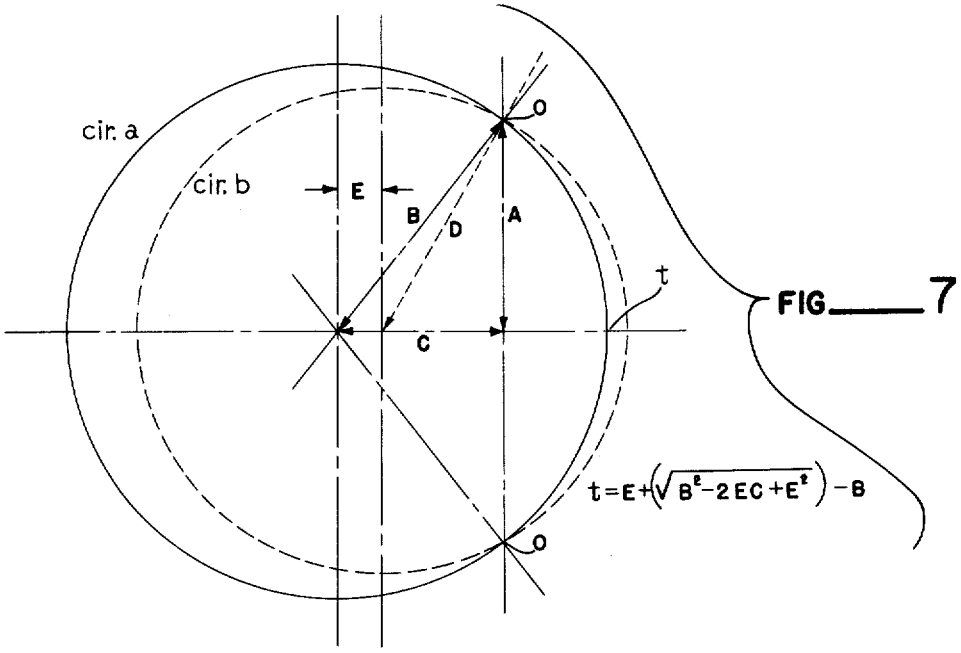
FIGURE 7 is a diagrammatic view showing how the actual tightening grind is achieved by shifting the die-half toward the generating center and illustrating the values used in the formula devised for determining the amount of the tightening grind.

FIGURE 7 illustrates an application of the formula:

$$t=E+(\sqrt{B^2-2EC+E^2})-B$$

Substituting in this formula an offset value of .010 inch for E, a radius B of 2.625 inches and a value of 1.78125 inches for C, then we arrive at a solution for t of .0032 inch. The actual radius D of circle B does not need to be known, in the machine operation of making the tightening grind, because the proper value is reached when circle A intersects circle B at points O, as the actual die-tightening grind on the pointed die, as shown in FIGURE 2, is achieved by shifting the die half as 30 or 32 toward a generating center and re-grinding the portion of the die that will thus produce the tightening of the patch. This is shown graphically by the circular lune area indicated as t.

It is believed that it will be clearly apparent from the above description and the disclosure in the drawings that the invention comprehends a novel Method and Means for Producing Tight-Fitting Patches for Use in Plywood-Patching Machines.

Having thus disclosed the invention, I claim:

1. A cutting and compressing die for veneer patching machines, comprising: a base block having a planar surface to receive veneer to be patched and including an elliptical female cutting opening providing a female cutting edge extending from said planar surface through said base block; wall means perpendicular to said planar surface forming an elliptical male cutting edge at the opposite surface of said base block and surrounding said through cutting opening; said elliptical female and male cutting edges being characterized by identity in length, except for working clearance, but each said male cutter edge being enlarged between 0.001" and 0.007" outward from the longitudinal axis of said ellipses beyond the corresponding cutter edge of the female cutting opening; the inner surfaces of said opening providing an upper wall portion perpendicular to and adjacent said planar surface; an outwardly stepped lower wall portion adjacent the male cutting edge perpendicular to said planar surface; and a sloping surface joining said two wall portions.

2. A cutting and compressing die for veneer patching machines, comprising: a base block having a planar surface to receive veneer to be patched and including a through opening extending from said planar surface through said base block; wall means forming an upper cutting edge on the upper face of the base block and a lower cutting knife edge at the opposite surface of said base block and surrounding said through cutting opening; said cutting knife edge adapted to be sharpened only on its outer surface; said upper cutting edge and said lower cutting knife edge being characterized by identity in cutting size, except for working clearance, said lower cutting edge being enlarged between 0.001" and 0.007" outward from the longitudinal axis of said die openings beyond the corresponding upper cutting edge of the through cutting opening at the minor axis and diminishing to zero at each end of the longitudinal axis; the inner surfaces of said opening housing a wall portion perpendicular to and adjacent said planar surface; an outwardly stepped wall portion adjacent the male cutting edge perpendicular to said planar surface; and a conical surface joining said two wall portions.

3. A sequential die and operating means therefor for producing tight-fitting wood patches for patching veneer sheets used in the production of plywood, consisting of: a compound die, formed of two portions joined along its major axis and each portion having a similar circular segment cut therein, having a planar surface for engaging a sheet of veneer to be patched; means for holding said sheet in operational contact with said planar surface; an opening through said die at right angles to said planar surface; the upper portion of said opening formed as a vertically walled table die; a hole punch adapted to coact with said table die to cut out defects in said veneer sheet; a male portion of said table die extending out from the side opposite the planar surface and terminating in a sharply rimmed cutting portion sharpened on its outer surface; said male die portion having an inner wall disposed at right angles to said planar surface, and an outer wall angularly disposed to said inner wall; said inner wall of the male die portion outwardly disposed from the corresponding portion of the table die inner wall by lune increments varying from a maximum at the minor axis approximately of 0.007" to 0.001" and decreasing to each end of the die opening to approximately zero; a plug punch adapted to coact with said table die to cut a patch from another sheet of veneer that will be oversize for the hole cut by the table die and hole punch by said increments; a tapering portion of the hole through said compound die connecting the parallel walls of the table die and the inner wall of the male portion of the die; and said plug punch adapted to force said patch up through the male die portion, the taper portion and the upper portion of the table die, thus compressing the patch across the grain of the wood and finally seating the patch in the previously cut hole in the veneer.

4. A sequential cutting and compressing die having an elongated opening and operating means therefor for producing tight-fitting wood patches for patching veneer sheets used in the production of plywood, consisting of: a compound die, formed of two wall portions and each portion being formed by a similar circular segment, having a planar surface for engaging a sheet of veneer to be patched; means for holding said sheet in operational contact with said planar surface; an opening through said die at right angles to said planar surface; the upper portion of said opening formed as a vertically walled female die; a hole punch adapted to coact with said female die to cut out defects in said veneer sheet; a downwardly disposed portion extending out from the side opposite the planar surface and terminating in a sharply rimmed cutting portion; said downwardly extending die portion having an inner wall disposed at right angles to said planar surface, and an outer wall angularly disposed to said inner wall; said inner wall of the said die portion outwardly disposed from the corresponding portion of the female die inner wall by lune increments varying from a maximum at the minor axis of 0.001 to 0.007" and decreasing to each end of the die opening to form an enlarged portion of the die; a plug punch adapted to coact with said die to cut a patch from another sheet of veneer that will be oversize for the hole cut by the female die and hole punch by said lune increments; a tapering portion of the hole through said compound die connecting the parallel walls of the female and adapted to act as a forcing cone and the oversized portions of the die; and said plug punch adapted to force said patch up through the oversized die portion, the taper portion and the female portion of the die, thus compressing the patch across the grain of the wood and finally seating the patch in the previously cut hole in the veneer.

5. Die means for use in sequential veneer patching machines, comprising: a table die, fixedly positioned, and having a through opening; an upper *female* cutting edge around the upper end of said opening and a hole punch die adapted to coact with said *female* cutting edge to cut out defects in veneer sheets and leave a hole suitable for patching; a lower cutting knife edge and a plug punch adapted to coact with said lower cutting edge to cut a patch from a separate sheet of veneer [to fit said hole] and to force said patch up through said through opening and insert it in said hole; said hole punch die having an outer wall perpendicular to the face of said veneer and adapted to coact with said *upper female cutting edge of said* table die to produce a hole in said veneer with walls perpendicular to the face of said veneer; said lower cutting edge having *an inner wall perpendicular to the face of said veneer and* the same opening length along the longitudinal axis as said *hole* [upper cutting edge] and a width *between 0.002"* and *0.014"*[.007'] greater at its minor axis than *said hole* [the upper cutting edge] and decreasing towards the ends of the longitudinal axis to zero; said plug punch adapted to coact with the lower cutting edge of said table die to cut said patch and force it up through said opening in said table die, compressing said patch perpendicular to the grain, and seating said patch in said hole.

6. A method of producing and inserting tight-fitting patches in veneer sheets comprising: (1) cutting a defective portion out of a sheet of plywood veneer to provide a cut-out opening having a peripheral wall perpendicular to the face of said veneer; (2) punch cutting a plywood veneer replacement patch having a peripheral wall perpendicular to the surface of the patch using a cutter member having vertical interior walls, said patch having a width exceeding the corresponding width of said cut-out opening by an amount up to *0.014"* [0.007"] at the cross-grain axis and decreasing to *approximately zero* [a maximum of *0.001"*] at the width-grain axis; (3) forcing said replacement patch through a tapered opening into a hollow member having vertical interior walls the same size as said cut-out opening to thereby laterally compress said replacement patch to reduce the width of said replacement patch to the size of said cut-out opening, and ejecting said cut-out patch from said hollow member into said cut-out opening in said veneer.

References Cited in the file of this patent or the original patent

UNITED STATES PATENTS

| | | |
|---|---|---|
| 35,874 | Graves | July 15, 1862 |
| 138,357 | Allen | Apr. 29, 1873 |
| 1,177,005 | Zimmerman | Mar. 28, 1916 |
| 2,175,654 | Alenius | Oct. 10, 1939 |
| 2,336,703 | Skoog | Dec. 14, 1943 |
| 2,454,016 | Skoog | Nov. 16, 1948 |
| 2,583,396 | Skoog | Jan. 22, 1952 |

FOREIGN PATENTS

| | | |
|---|---|---|
| 635,699 | Germany | Sept. 25, 1936 |